United States Patent [19]
Gibble et al.

[11] 3,857,866
[45] Dec. 31, 1974

[54] PROCESS FOR IMPROVING THE THERMAL STABILITY OF SOYBEAN OIL

[75] Inventors: Walter P. Gibble; Edward J. Reid, both of Brea, Calif.

[73] Assignee: Hunt-Wesson Foods, Inc., Fullerton, Calif.

[22] Filed: June 8, 1973

[21] Appl. No.: 368,014

[52] U.S. Cl.............................. 260/420, 260/428
[51] Int. Cl............................ C09f 5/10, C11b 3/00
[58] Field of Search............................ 260/420, 424

[56] References Cited
UNITED STATES PATENTS
3,354,188  11/1967  Bock et al.......................... 260/424
3,758,532  9/1973  Gibble................................ 260/420

Primary Examiner—Elbert L. Roberts
Attorney, Agent, or Firm—Gerald L. Price

[57] ABSTRACT

Unhydrogenated, refined soybean oil is deaerated, saturated with carbon dioxide and heated to a temperature above 212°F in the presence of a minor amount of a finely divided, activated, solid, metal salt or oxide, such as a bleaching earth, clay, etc., optionally in the presence of a minor amount of activated carbon. The oil is then filtered and deodorized under conditions excluding air to yield a finished treated oil which is almost colorless, very bland in flavor and which exhibits excellent odor stability as the oil is heated to frying temperature. Upon heating to frying temperature and for a period thereafter, the oil is essentially odorless.

17 Claims, 2 Drawing Figures

PROCESS FOR IMPROVING THE THERMAL STABILITY OF SOYBEAN OIL

BACKGROUND OF THE INVENTION

1. Field of the Invention

The present invention relates to a method of processing edible frying oils and more particularly toward a method of improving the odor and thermal stability of unhydrogenated, refined soybean oil.

2. History of the Prior Art

Soybean oil represents a readily available and relatively inexpensive source of nutritious vegetable oil. However, finished soybean oil processed by normal industrial practice has the characteristic of readily evolving objectionable odors at frying temperatures, that is, temperatures within the range of about 350°F to about 400°F or higher. This odor has been variously described as a beany, grassy, and/or fishy smell. This odor is quite pungent, markedly unpleasant, and very unappetizing. In the case of finished soybean oil (refined, bleached, and deodorized soybean oil), this objectionable odor can occur in a matter of seconds upon heating at or near frying temperature.

Many attempts have been made in the art to eliminate the objectionable frying odor of soybean oil. One solution which is commercially employed is to partially hydrogenate the soybean oil. See "Advances in Research on the Flavor Stability of Edible Soybean Oil" by J. C. Cowan, published in *Food Technology*, Vol. 19, No. 9, pages 107-146 (1413-1452), 1965. Partial hydrogenation has been quite successful in increasing flavor stability of soybean oil for room temperature use or storage. However, the hydrogenation process must be carefully controlled to prevent the resulting hydrogenated soybean oil from obtaining a lard-like consistency. Further, hydrogenation increases the amount of saturated fatty acids in soybean oil. Many experts in the dietary field believe increased saturation by hydrogenation causes a decrease in the nutritional value of soybean oil because of the formation of un-natural isomers, both positional and geometric. Furthermore, increased saturation of the oil is believed by many physicians to be undesirable in today's diets. Hydrogenation also increases the price of the finished soybean oil because it produces stearine which must be removed by a conventional winterization process prior to marketing; this increases cost due to the added unit process step and due to the decreased over-all yield of the marketable finished soybean oil.

A second method which is commercially used today for increasing the stability of soybean oil is deodorization (see the above cited J. C. Cowan article). Deodorization, which involves a vacuum steam stripping of the oil, optionally in the presence of citric acid, improves the storage flavor stability of soybean oil. However, this stability is only for a short period of time and has little, if any, effect on the odor stability of soybean oil at frying temperatures.

Another method of increasing the flavor stability of soybean oil is disclosed and claimed in Harvey D. Royce's U.S. Pat. No. 2,349,381, issued May 23, 1944. The method disclosed in this patent comprises heating the soybean oil at a temperature between 240°C and 300°C out of contact with air and the presence of finely divided particles of zinc, magnesium, or tin for a period of between 10 and 120 minutes. This method, which has not been commercially successful, increases the flavor stability of soybean oil for room temperature use, such as for salad oil. However, this method has little effect in eliminating the undesirable odors that develop when frying with soybean oil.

In copending applications Ser. No. 71,328, filed Sept. 11, 1970, and Ser. No. 116,456, filed Feb. 18, 1971, there is disclosed a process for stabilizing the odor and aroma of unhydrogenated soybean oil at frying temperatures by means of a process including the steps of deaerating the oil, saturating the oil with carbon dioxide, treating the saturated oil with a copper-chromium catalyst at a temperature of about 250°C for about 1 hour, optionally in the presence of carbon, filtering the treated oil, and then bleaching and deodorizing the oil. The finished, treated oil exhibited satisfactory performance at frying temperature. However, the process was not considered economical and was not put to commercial use due to the high energy requirement during the treatment step and the cost of the catalyst which was expended in the filtration after each treatment step.

OBJECTS AND SUMMARY OF THE INVENTION

It is therefore an object of this invention to provide an improved method of eliminating objectionable odors and flavors of unhydrogenated soybean oil at frying temperature.

A further object of the present invention is the provision of a method of improving the odor and flavor stability of unhydrogenated soybean oil under frying conditions without increasing the saturation content of the soybean oil, without decreasing the nutritional value of the soybean oil and without increasing the stearine content of the soybean oil as a result of hydrogenation.

Another object of the invention is invention provision of a process for simplified, the aroma and flavor of soybean oil at a frying temperature which does not require hydrogenation or the use of expensive treating catalysts or high temperatures.

A still further object of the innvention is the provision of a simplfied, efficient and economical process for improving the flavor and odor stability of highly unsaturated soybean oil both at frying temperature and at ambient conditions for prolonged periods of storage.

Another object is the provision of a treated, unsaturated soybean oil suitable for cooking purposes, vegetable oil purposes and salad oil usages.

These and many other objects and attendant advantages of the invention will become apparent as the description proceeds.

A flavor and aroma stable oil is produced according to the invention by a process including the steps of degassing refined, unhydrogenated refined soybean oil to remove a substantial portion of atmospheric oxygen from the oil, dissolving carbon dioxide in the degassed oil and then dispersing a minor amount of finely divided, activated metallic salts and oxides including bleaching earths, clays, etc., and heating the dispersion in a carbon dioxide atmosphere to a temperature between 212°F and 260°F for a predetermined length of time. The treated oil is then filtered and deodorized to provide a finished oil having the desired characteristics.

The process of the invention is absent hydrogenation and does not develop any saturated components, nor is there a necessity to winterize to remove stearine. Furthermore, the catalyst treatment step is obviated and bleaching and treatment may be combined in a single step. The finished product is a clear, almost odorless, virtually colorless, edible, highly nutritious cooking, salad or frying oil and has substantially the same unsaturation content at the starting refined unsaturated soybean oil. The treating step is conducted at lower temperature and for shorter periods than required in the prior processes.

The invention will now become better understood by reference to the following detailed decription when considered in conjunction with the accompanying drawings.

DESCRIPTION OF THE PREFERRED EMBODIMENTS

Figure 1:
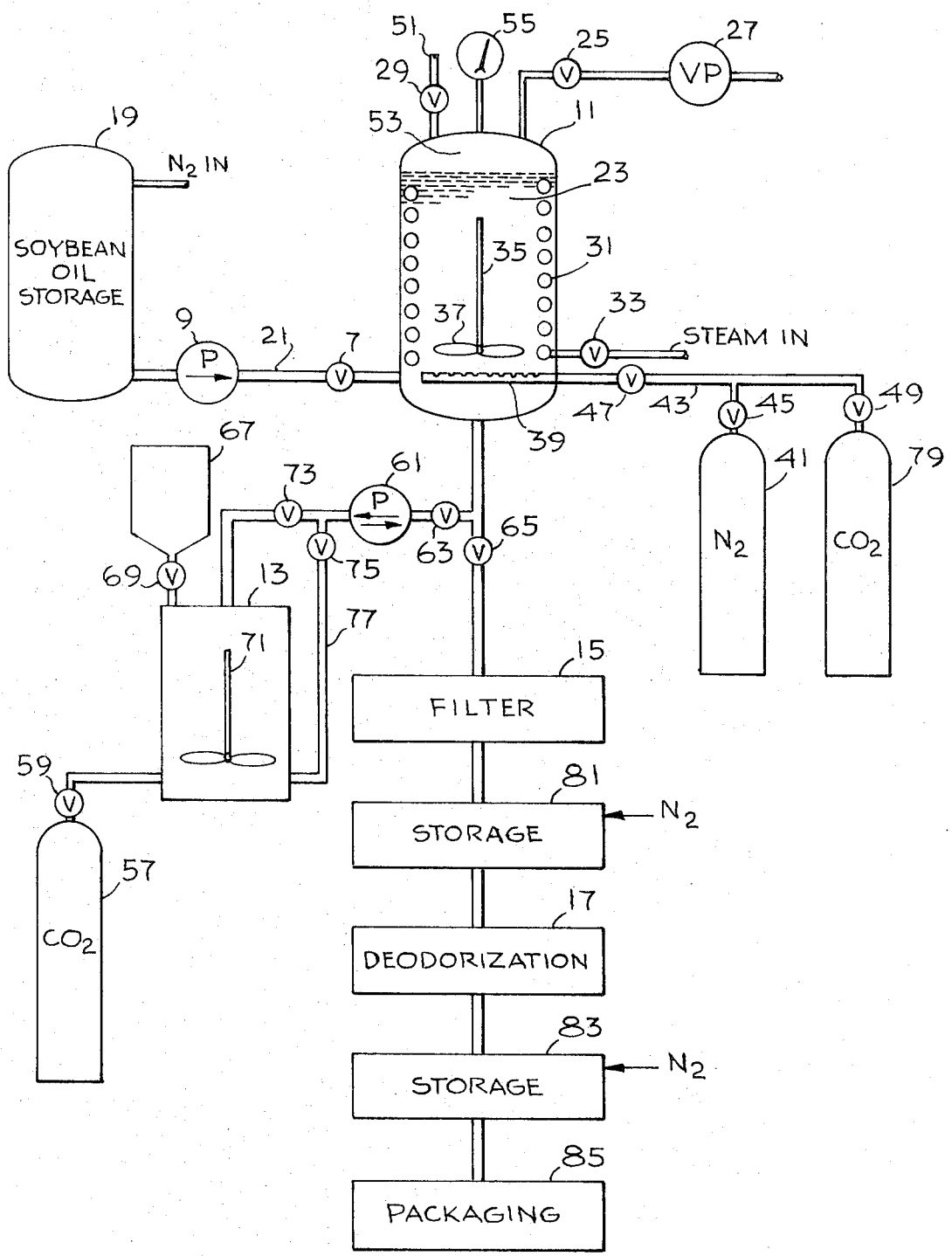
FIG. 1 is a block and schematic view of a system for treating refined, unhydrogenated soybean oil according to the invention.

Referring now to FIG. 1, a semi-continuous system for treating unhydrogenated soybean oil is illustrated. The system generally includes a reaction vessel 11, a slurrying tank 13, filtering unit 15 and a deodorization section 17.

Freshly refined or nitrogen inerted stored, refined (i.e., water-washed and dehydrated), unbleached, unhydrogenated soybean oil is directly pumped from the dehydration section of the refining unit or pumped from a nitrogen inerted storage tank 19 through line 21 by means of pump 9 into reation vessel 11 with valve 7 open. When reaction vessel 11 is full, the charge 23 is deaerated by opening valve 25, closing valve 29, and at a pressure of at least 26 inches mercury vacuum to the charge by means of vacuum pump 27.

The charge is heated to a temperature greater than 70°F during deaeration, suitably from 100°F to 110°F by supplying steam to internal heating coils 31 from a source not shown, with valve 33 open. Stirrer rod 35 and blade 37 are rotated by means of a motor, not shown.

Nitrogen is bubbled into the bottom of the charge during deaeration by means of a perforated pipe 39 supplied with nitrogen from a regulated source 41 through line 43 with valves 45 and 47 open and valve 49 closed. When the oxygen level of the charge 23 of unhydrogenated soybean oil has been reduced to no more than 0.1 mm $pO_2$, deaeration is discontinued.

Nitrogen flow is discontinued by closing valve 45 and the vacuum is terminated by shutting off vacuum pump 27 and closing valve 25. The vacuum is broken with $CO_2$ by opening valve 49 and the charge 23 of oil is saturated with $CO_2$ from the regulated source 79. When the pressure in the headspace 53 as read on gauge 55 reaches atmospheric, valve 29 in vent pipe 51 is opened and $CO_2$ injection through perforated pipe 39 is continued.

A slurry of the solid treating agent is prepared after the charge 23 has been fully saturated with $CO_2$. The slurry tank 13 is prefilled with $CO_2$ from regulated source 57 by opening valve 59. A portion, usually no more than 10 percent, of the charge 23 of $CO_2$ saturated soybean oil is transferred to slurry tank 13 by means of reversible pump 61 with valve 63 open and valve 65 closed. The solid treating agent (activated clay and carbon mixture) is slowly added to slurry tank 13 from hopper 67 by means of gate valve 69. Agitation from paddle blade mixer 71 is continued until the solids are thoroughly dispersed in the oil to form a slurry.

The slurry is then transferred to the reaction vessel 11 through return line 77 by reversing pump 61 and closing valve 73 and opening valve 75. Treatment is then effected by raising the temperature of the charge to 245°F by increasing the steam flow in heating coil 31 and treatment is continued at that temperature for about 30 minutes. Vent valve 29 is then closed as is valve 49 to the $CO_2$ supply 79.

The $CO_2$ content of the treated charge 23 is then removed by activating vacuum pump 27 and opening valve 25. The vacuum is broken with nitrogen by opening valve 45 and bubbling nitrogen into the charge until the pressure in the headspace 53 is at atmospheric as sensed by gauge 55. The vent valve 29 may be opened at this point.

The nitrogen inerted charge 23 is then filtered through filter 15 with valve 65 open and deodorized directly in deodorization unit 17 or after storage in nitrogen inerted storage tank 81. After deodorization, the oil is again stored in a nitrogen inerted storage tank 83 before being sent to packaging 85.

Figure 2:
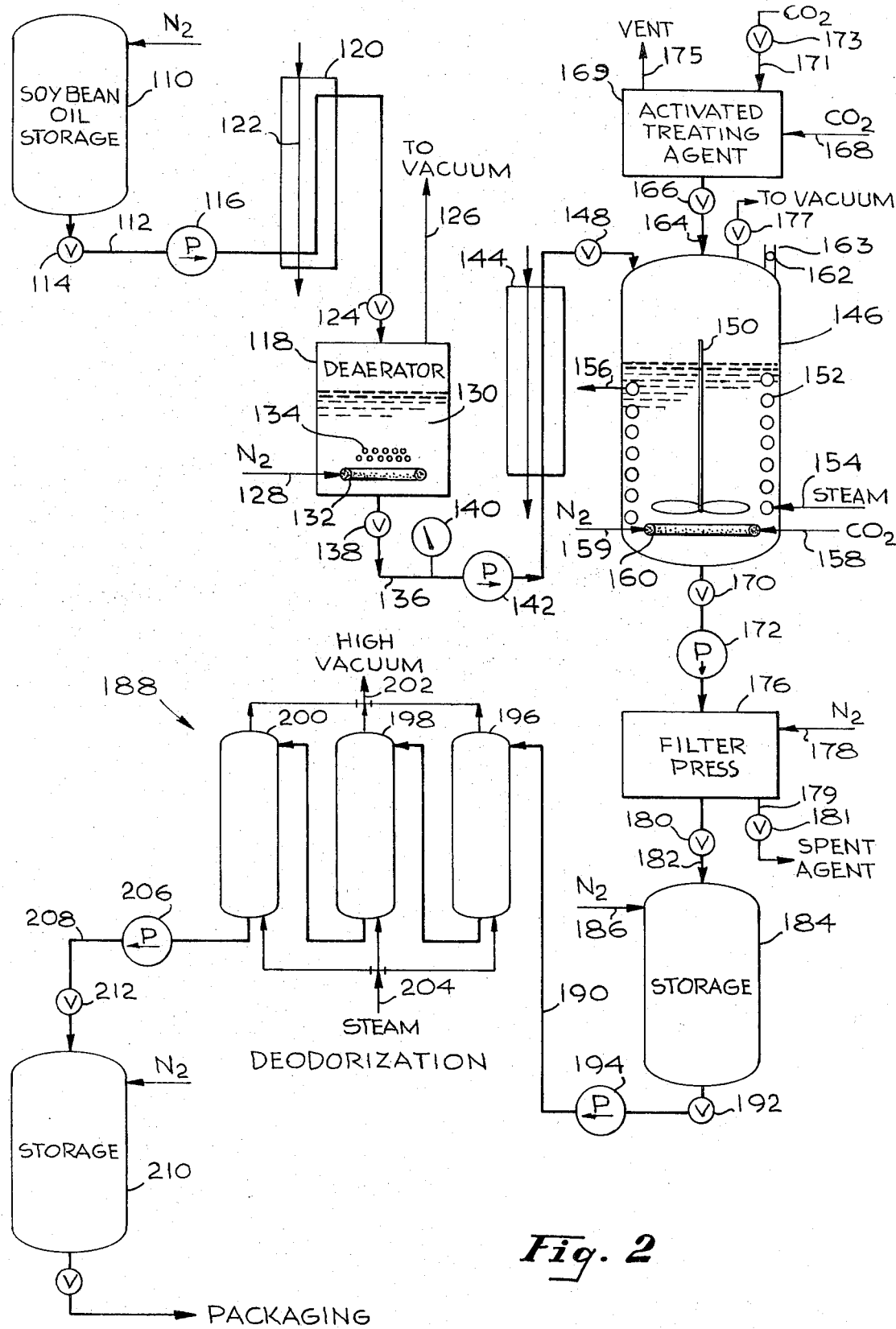
FIG. 2 is a schematic view of another system in accordance with the invention.

A more detailed continuous process is described in FIG. 2.

Referring now to FIG. 2, freshly or nitrogen inerted, refined (i.e., water-washed and dehydrated), unbleached, unhydrogenated soybean oil is directly pumped from the dehydration unit or is pumped from a nitrogen inerted reservoir storage tank 110 through line 112 by means of pump 116 into vacuum deaerator 118 when valve 114 is open. This assures minimization of oxygen degradation of the freshly prepared, refined soybean oil. The oil in line 112 is preheated in the preheater 120 to a temperature between about 70°F and 135°F, preferably about 130°F by means of heat exchange fluid or a steam heat exchanger which passes through the preheater 120 within line 122. Preheating the oil to at least 70°F increases the rate of evolution of dissolved or entrained gases from the oil during deaeration and decreases the solubility of the oil with respect to the gases normally present. However, preheating should be maintained below about 135°F to minimize reactions between the oil and oxygen during deaeration which can develop off flavors in the oil.

After preheating in preheater 120, the oil is optionally filtered before entering deaerator 118. The preheated oil is delivered to the deaerator 118 when valve 124 is open. During deaeration a vacuum of at least one-half atmosphere, preferably less than 2 inches of mercury is drawn on the deaerator 118 through line 126 which leads to a trap and a vacuum pump, not shown. Deaeration is conducted by introducing an inert gas such as nitrogen through line 128 at a point near the bottom of the deaerator tank 118. The nitrogen may be introduced as a spray through jets or other equivalent means of liquid-gas contact but is preferably introduced as evenly sized small bubbles having a diameter between 10 to 20 microns by means of a sparger ring 132 formed of sintered porous steel which evolves bubbles 134 which rise through the charge of soybean oil 130 and cause the evolution and removal of entrained and dissolved gases through the vacuum line 126.

At least 99 percent of oxygen is removed from the soybean oil during this operation to prevent development of off flavors and odors during the remainder of the process. The warm, deaerated soybean oil is pumped from the deaerator 118 through line 136 which contains in sequence valves 138, oxygen sensor 140, pump 142 and a heater 144. The heater can be a conventional process steam heater such as an indirect heat exchanger. The oxygen sensor 140 may be connected to an analyzer, not shown, which measures the oxygen level in the warm, deaerated oil and may be utilized to develop a control signal to lower the oil flow rate through the deaerator as the oxygen level in the oil exceeds the predetermined level.

The warm, deaerated oil is heated in the heater 144 to a temperature between about 212°F to 260°F, preferably between about 240°F to 245°F. Below 212°F there is an absence of beneficial effect within the treating tank 146. At treating temperatures above 260°F, the unhydrogenated soybean oil is found to deteriorate, break-down and degrade in flavor and other characteristics. The heated oil in line 136 is delivered to tank 146 when valve 148 is open. The oil is stirred by means of stirring rod and paddle 150 and is maintained at treatment temperature of 212°F to 260°F, and preferably 240°-245°F, by means of an internal heating coil 152 which receives a flow of input steam through inlet 154 which circulates around the girth of the tank 146 and leaves through outlet 156. A positive pressure of carbon dioxide is applied to the body of oil from an inlet 158 which connects a source of carbon dioxide, not shown, to a carbon dioxide inlet member, suitably a sparger ring 160. After the oil is at least 50 percent saturated with carbon dioxide and preferably fully saturated therewith, and evolving through vent 162, the activated treating agent is added to the tank from holding tank 169 through line 164 when valve 166 is open. The treating agent is preferably converted into a slurry by adding a small amount of $CO_2$ saturated, refined oil to the holding tank 169 through line 171 when valve 173 is open. The slurry tank is purged with carbon dioxide through line 168 and vent 175 to remove any entrained oxygen from the tank before forming the slurry.

The carbon dioxide saturated oil is treated with the agent at the specified temperature for at least 20 minutes while continuing carbon dioxide flow into the tank 146 to prevent incursion of air into the vent valve 163. Optionally the $CO_2$ is then removed by discontinuing the flow through inlet 158, applying vacuum to the vessel 146 with valve 177 open and then introducing nitrogen into the sparger ring 160 from source 159. Valve 170 is then opened and the treated oil is pumped by means of pump 172 to filter press unit 176. The oil is filtered at a temperature of 220°-240°F in a nitrogen inerted filter press 176 into which a flow of nitrogen is maintained through inlet 178. The spent activated treating agent solids with entrained odor and taste forming bodies are removed from the press 176 through line 179 when valve 181 is open. Valve 180 is opened and the filtered oil is delivered through line 182 to a nitrogen inerted storage tank 184 having a nitrogen inlet 186.

In a continuous process the nitrogen saturated oil in line 182 would be directly delivered to the deodorization station 188. The stored oil is then fed through line 190 when valve 192 is open and pump 194 actuated into the deodorization towers 196, 198 and 200. High vacuum was applied to the towers through line 202 and steam is delivered to the towers through line 204. Deodorization is typically conducted at temperatures from 425°-525°F and under high vacuum of no more than 8 mm of mercury. In the process of the invention, deodorization is preferably conducted at temperatures in the range of 500°-515°F and at pressures of between 4-6 mm of mercury. After deodorization, the treated oil is saturated with nitrogen and is pumped by means of pump 206 through line 208 into a nitrogen inerted storage tank 210 when valve 212 is open. From storage the oil can be packaged in containers for marketing.

Processing of unhydrogenated soybean oil according to the above-described general procedure results in a clear, almost odorless, edible soybean oil, having excellent storage characteristics under ambient conditions in the dark or when exposed to light in an oxygen-free atmosphere. Furthermore, the oil does not develop objectionable odors or flavors for at least 10 minutes when heated to frying temperatures of from 325°-400°F. The process of the invention eliminates hydrogenation, winterization, catalyst treatment and separate bleaching. In the process of the invention, the treatment step is conducted at moderate temperature which conserves considerable energy as compared to separate catalytic treatment at high temperature and a separate bleach at elevated temperature. Furthermore, the process utilizes a much less expensive treating agent as compared to the copper-chrome catalytic agents previously utilized. The finished treated oil is essentially without odor and the Iodine Number is essentially the same as the starting material, thus maintaining the desirable nutritional value of the unhydrogenated material.

The starting material for the process of the invention is refined, water-washed and dehydrated soybean oil having the following properties:

TABLE 1

| Ingredient | Amount |
| --- | --- |
| % FFA | Less than 0.05% |
| Soap | Less than 50 ppm |
| Phosphorous | Less than 2 ppm |
| Iron | Less than 1 ppm |
| Copper | Less than 0.1 ppm |
| Moisture | 0.1% |
| Oxygen, dissolved | Less than 15.0 mm $pO_2$ |
| Color R(lov. max.) | 13.6 |

The process of the invention was practiced successfully on unhydrogenated soybean oil (USBO) from diverse growing areas and sources except for a dark type of oil which was extracted from damaged soybeans and has a higher than normal content of phosphatides and monoglycerides.

The refined soybean oil is degassed under vacuum of less than 8 mm of mercury and preferably with agitation to reduce dissolved oxygen content to below 0.1 cc oxygen/100 cc of oil. The oil must not be heated to a temperature above 150°F during deaeration and preferably below about 135°F. The oil is saturated with $CO_2$ after leaving the deaerator either in a separate unit or within the treatment tank.

The deaerated, $CO_2$ saturated, heated oil is then subjected to a contact with a minor amount of the treating agent at a temperature of from 212°F to 260°F for at least 20 minutes. The treating agent comprises 1-3 percent by weight of finely divided, activated, inorganic, metallic salts or oxides, including bleaching earths, clays, etc., optionally containing from 0.1 to 0.4 percent by weight of activated carbon. The treatment is conducted for a period from 15 minutes to 10 hours, preferably 20 to 30 minutes. Air is again excluded in this and other steps of the process.

The effective inorganic salts are those which are known to be effective absorbents for removing color bodies such as chlorophyll from vegetable oils such as aluminum silicate clays and preferably the variety thereof known as bleaching clays and especially the activated clay varieties thereof. Though it has not been possible to determine the exact mechanism of the reaction resulting in stabilizing the oil at frying temperature, it is believed that the active sites of the finely divided solids binds the off-flavor and odor precursors and causes them to be modified in the presence of the dissolved carbon dioxide gas. The modified precursors are removed from the oil during treatment, filtration and/or vacuum-steam deodorization.

The clays may be the natural active bleaching earths or the mineral acid activated bleaching earths or clays. Representative natural clays are Fuller's earth, and Natural bleaching clay — Southwest type. A high silica to alumina ratio of 3–4/1 seems to be characteristic of the natural bleaching clays. The natural clays are neutral whereas the acid activated clays have an acidity of from 1 to about 5 mg KOH/g. The acid activated clays are found to be better decolorizing adsorbents than the natural clays. The clays convertible to more effective adsorbents by acid treatment generally have the property of swelling in water. The general empirical analyses of the clays which are acid activated follow.

TABLE 2

| Constituents | %, by weight |
|---|---|
| $SiO_2$ | 47–58 |
| $Al_2O_3$ | 15–16 |
| $Fe_2O_3$ | 2.5–3.5 |
| FeO | — |
| MgO | 4.0–4.5 |
| CaO | 1.0–2.5 |
| $Na_2O$ | 0.5–1.75 |
| $K_2O$ | 0.5–1.0 |

Acid activated clays are prepared by treating the clay with mineral acid, HCl or $H_2SO_4$, in a treating vessel and heating the mixture with live steam at 2–3 atmospheres. With HCl activation at 105°C requires 2–3 hours while $H_2SO_4$ requires twice that time. Typically one ton of technical HCl (19° to 21° Be) is utilized per ton of dry clay. When decomposition of the clay is complete, the acid sludge is pumped to a filter press, the clay filtered out and washed with dissolved salts and free acids are removed, after which the clay is dropped from the press, dried, disintegrated and packaged.

Representative commercial acid activated bleaching clays useful in the process of the invention are BC 200, Nutrol Tonsil Optimum FF and Filtrol Grade 105, Filtrol Special and A.O.C.S. Bleach Earth. The typical properties of Filtrol 105 are reported in the following table.

TABLE 3

Particle Size Analysis

| | |
|---|---|
| By roller (10 liters/min. air rate) | |
| 0–5 microns, Wt. % | 8 |
| 0–20 microns, Wt. % | 45 |
| By Tyler Standard Sieve | |
| Through 100 mesh, Wt. % | 100 |
| Through 200 Mesh, Wt. % | 97 |
| Through 325 Mesh, Wt. % | 78 |
| Apparent Bulk Density, lb/cu.ft. | 35 |
| Free Moisture, Wt. % | 15 |
| Free & Combined Moisture, Wt. % (loss at 1700°F) | 21 |
| Surface Area (BET Method), $M^2/gm$ | 300 |
| Acidity, Phenolphtalein, mg. KOH/gm | 4.8 |
| Filter Rate, cc/min. | 38 |
| Oil Retention, Wt. % | 35 |

Comparative bleaching effect and chlorophyll evaluation of the Filtrol clays are reported in the following table.

TABLE 4

| | 0.5% Level | | 1.0% Level | | 1.5% Level | | 2.0% Level | |
|---|---|---|---|---|---|---|---|---|
| | Bleach Color | Chlor. ppm | Bleach Color | Chlor. ppm | Bleach Color | Chlor. ppm | Bleach Color | Chlor. ppm |
| Filtrol 105 | 4.9 | 0.4 | 4.1 | 0.1 | 3.4 | 0.0 | 3.0 | 0.0 |
| Filtrol Special | 5.5 | 1.2 | 4.6 | 0.4 | 3.8 | 0.1 | 3.6 | 0.0 |
| A.O.C.S. Bleach Earth | 6.1 | 1.6 | 5.1 | 0.8 | 4.6 | 0.6 | 4.4 | 0.3 |

At the lower treatment levels (0.5 to 1.0 percent) Filtrol 105 was three to four times more effective than Filtrol Special in chlorophyll removal. When these clays were utilized in the process of the invention, Filtrol 105 provided oils having the best characteristics at frying temperature. Even though the improved stability at frying temperature does not appear to be related to chlorophyll content, the clays which are more efficient adsorbers for chlorophyll appear to be more effective in the treating step of the invention.

The activated carbon is generally a type of carbon known as a decolorizing carbon produced by the destructive distillation of cellulose such as wood followed by activation with an oxidizing medium such as air, oxides of carbon, chlorine superheated steam or mixtures of steam and air. The decolorizing carbons are generally soft, finely pulverized and highly porous. A representative finely divided activated carbon is the Nuchar brand of activated charcoal.

The contact of the hot oil-clay-charcoal mixture with carbon dioxide provides the stabilizing effect required in this invention. Although the optimum level will vary for particular vessels, oils and other conditions, successful operation has been achieved consistently with $CO_2$ quantities sufficient to saturate the oil at 110°F to 135°F. At 75°F, approximately 0.61 ml $CO_2$ is dissolved in 1 ml of oil at atmospheric pressure. Although the minimum amount of carbon dioxide required for the treatment has not been ascertained, it is believed that a treatment with 100 standard cubic feet of carbon dioxide per ton of oil will provide a significant stabilizing effect.

The treated mixture is filtered to remove the spent solids containing the color, flavor and odor bodies and to assure removal of the colloidally dispersed clay and charcoal so as to prevent cloudiness and assure a product with good brilliancy. The oil is purged with nitrogen under a vacuum of at least one-half atmosphere to assure absence of oxygen and to purge and remove the carbon dioxide. Prolonged contact of the finished oil with carbon dioxide is found to cause the development of undesirable flavors and oil so exposed to carbon dioxide is not stable in light.

Filtration aids such as diatomaceous earth may be added to increase the rate and effectiveness of filtration, especially in hydroshock type of units.

The stabilization treatment of the invention is completed by vacuum steam deodorization during which small amounts of impurities which contribute to undesirable flavor and odor at room temperature and at frying temperature are removed. In the process of the invention, it is found to be beneficial to avoid the presence of iron surfaces. High iron content affects the color and frying temperature stability of the finished, treated soybean oil. The oil is deodorized at a pressure of between 1 and 10 mm of mercury and a temperature of 450°–520°F for about 1–4 hours. Citric acid in an amount of about 33 ppm of oil may be present. The deodorizer must be run under best plant practice conditions since the treated product of the invention must not have any off-flavor or off-color properties.

Each of the vessels is connected to a high vacuum system. The oil is treated batchwise sequentially in each vessel. In the first vessel the oil is heated by high pressure steam and live steam is blown through the oil. In the succeeding vessels, the oil is further heated to a temperature of about 500°F again with live steam injection. The steam strips off the impurities which are carried away by the vacuum system. After treatment is completed, the oil is cooled and may be fine filtered before being pumped to nitrogen inerted storage.

The following example illustrates a pilot plant run of the process of this invention.

EXAMPLE 1

Deaeration

Refined, water-washed, dehydrated soybean oil was vacuum deaerated to reduce dissolved oxygen content to below 0.1 cc oxygen/100 cc oil. The oil was heated to a maximum of 150°F during deaeration. The oil was saturated with $CO_2$ by sparging after leaving the deaerator.

Treatment

The $CO_2$ saturated oil was treated with 2 percent Filtrol 105 and 0.25 percent activated carbon in a vacuum bleacher at 115°C (240°F). Time at 115°C was 20 minutes. A positive $CO_2$ pressure of 1 psig was maintained during bleaching. The bleaching clay-activated carbon mixture was held under $CO_2$ for 16 hours prior to adding to the oil. The oil was filtered at 105°–110°C (220°–230°F). The filtered oil was stored under $N_2$ prior to deodorization.

DEODORIZATION

Normal deodorization conditions of 6 mm Hg, 450°F to 460°F for 3 hours were employed.

The finished product had the following characteristics.

TABLE 5

| Property | Value |
|---|---|
| % Saturated Fatty Acids (SFA) | 15.5 |
| % Polyunsaturated Fatty Acids (PUFA) | 60.3 |
| % Monounsaturated Fatty Acids (MUFA) | 24.2 |
| % PUFA (CIS) | 60.3 |
| % PUFA (Trans) | 0 |
| % MUFA (CIS) | 24.2 |
| % MUFA (Trans) | 0 |

The finished product is of excellent nutritional quality. The high ratio of polyunsaturation to lower saturated fats is almost equal to corn oil and can be further improved by blending with other oils such as sunflower seed oil. The absence of trans fatty acids is equal to corn and safflower oils. The superior odor at frying temperature is as good as safflower oil. The flavor is bland. The finished oil has much greater resistance to cold weathering than hydrogenated-winterized oils and does not require chemicals, preservatives or coloring agents. The color is very light in the lovibond range of 0.0–0.2 red.

The intensity of color of four soybean oils heated in separate enclosed rooms was tested as described below.

EXAMPLE 2

Samples Tested:
A. 75 percent partially hydrogenated, winterized soybean oil — 25 percent winterized cotton seed oil.
B. Partially hydrogenated, winterized soybean oil.
C. Ex. 1 — specially processed unhydrogenated soybean oil.
D. Unhydrogenated soybean oil (typical commercially available).

Procedure

Heat 140 ml oil to frying temperature (375°F) in an enclosed room. Panelists were instructed to remain outside the room until frying temperature was reached at which time the panelists entered the room and evaluated the intensity of the oil aroma in the room and directly over the fry pan. The oil aroma intensity was rated on a 10 point Hedonic scale (10 = no aroma, 1 = extreme aroma).

The results of this test indicate that the aroma of specially processed unhydrogenated soybean oil (Ex. 1) was much less intense and, therefore, more acceptable than that of unhydrogenated soybean oil which has not been specially treated. The results also indicate that the aroma of the treated oil of this invention is better than that of hydrogenated soybean oil.

When BC Neutral bleaching clay was substituted for the BC 200 acid activated clay in the procedure of Example 1, an improvement in frying temperature odor stability was obtained as compared to untreated unhydrogenated soybean oil but was not nearly as effective as BC 200 in stabilizing the oil at frying temperature. Repeat of Example 1 utilizing air, $SO_2$, Chlorine, nitrogen, vacuum or anhydrous ammonia during the treatment step did not provide a stabilized oil. When Example 1 was repeated without nitrogen inerting the oil after the treatment step, the oil developed significant undesirable flavor and odor at room temperature and at frying temperature. Extended storage studies at 73°F for 12 months and at 100°F for 6 months of full and one-half full bottles having an air atmosphere were conducted. There was no significant deterioration in flavor of the full bottles. The one-half full bottles showed deterioration in flavor as assessed by an organoleptic panel. Light exposure does affect the odor and flavor scores.

The effect of carbon dioxide inerting of the clay and carbon slurry for 24 hours and the effect of deodorization pressure were investigated by varying the conditions of Example 1. The results are reported below.

TABLE 6

| Example | Treatment | Mean Odor Room | Pan | Mean Taste |
|---|---|---|---|---|
| 3 | Untreated Slurry – 0.5 mm Hg | 8.0 | 6.83 | 7.83 |
| 4 | Soybean Oil | 5.0 | 4.0 | 7.67 |
| 5 | $CO_2$ treated slurry – 0.5 mm Hg | 7.50 | 6.50 | 7.33 |
| 6 | Untreated slurry – 6.0 mm Hg | 6.67 | 5.67 | 7.00 |

The above results indicate that under laboratory conditions $CO_2$ storage of the clay-carbon slurry is without effect on the characteristics of the final product. This procedure may be required in pilot plant or plant runs where larger volumes are required and the possibility of entraining air in the solids is higher. Lower deodorization pressure appears to significantly improve odor performance.

A series of experiments were conducted to determine optimum process conditions. The results are reported in the following table.

TABLE 7

OPTIMUM CONDITIONS FOR A NEW USBO PROCESS

| | Conditions | 1st. | 2nd. |
|---|---|---|---|
| (A) | Time at bleaching temperature (min) | 40 | 20 |
| (B) | $CO_2$ pressure during bleaching (psi) | 1 | Atmospheric to 20 psig |
| (C) | treatment of clay-carbon mixture | No | Yes |
| (D) | Heat up rate (°C/min) | 9 | 2 |
| (E) | Temperature of oil when carbon-clay mixture added (°C) | 115 | 115 |
| (F) | Sparging rate of $CO_2$ (SCF/hr.) | 5.6 | 5.6 |

The first set of conditions will probably provide a product with the best flavor quality. However, for purposes of economics and plant practicality, the second set of conditions is recommended.

A 60,000 pound plant batch run was conducted as follows:

EXAMPLE 7

1. Charge 60,000 lbs. of refined SBO to the bleach kettle under vacuum.
2. Deaerate with agitation (25 rpm) and $N_2$ purge under vacuum of 23–25 inches Hg vacuum with recirculation until $O_2$ level becomes essentially zero.
3. Heat to 130°F with $N_2$ purge and agitation under vacuum.
4. Turn off $N_2$ line and break the vacuum with $CO_2$. Continue agitation and recirculation.
5. Saturate oil with $CO_2$ for 30 minutes until completely saturated. Open vent valve on top of kettle.
6. Transfer 5,000 lbs. of oil to $CO_2$ inerted slurry tank and add 600 lbs. of clay, 150 lbs. of carbon and 150 lbs. of FW14 and mix thoroughly.
7. Transfer slurry from the slurry tank to the bleach kettle and mix oil and slurry.
8. Heat to 240°F with agitation, continuous $CO_2$ sparging and recirculation.
9. Bleach for 30 minutes at 240°F with agitation and $CO_2$ sparging.
10. Transfer 5,000 lbs. of regularly bleached SBO to precoat mixing tank ($CO_2$ inerted) and add 30 lbs. of FW14 and mix.
11. Close the vent valve on top of kettle 3.
12. Deaerate with agitation and $N_2$ gas sparging to remove $CO_2$.
13. Recirculate from precoat tank to shock filter until clarified and filter oil.

Deodorization

1. Transfer 30,000 lbs. oil from inerted holding tank to deodorizer.
2. Deodorize at 500–515°F for one hour at a maximum vacuum possible using clean deaerated steam.

Analysis of the finished oil is presented in the following table.

TABLE 8

| Property | Value |
|---|---|
| Color | 1 Yellow/0.1 Red |
| % Free Fatty Acids | 0.02% |
| Chlorophyll | Non detected |
| Iodine Value | 130.6 |
| Total Phosphorous (ppm) | 0.33 |
| Iron (ppm) | 0.147 |
| Copper (ppm) | 0.020 |
| Cold Test (Hrs.), AOCS | 28.0 |
| Smoke Point | 415°F |
| Total Tocopherols (mg/kg) | 531 |

It is to be understood that only preferred embodiments of the invention have been described and that numerous substitutions, modifications and alterations are all permissible without departing from the spirit and scope of the invention as defined in the following claims.

what is claimed is:

1. A method of providing an edible soybean oil which does not develop objectionable odor or flavor for at least 10 minutes when heated to a frying temperature of from 325°F to 400°F consisting essentially of the steps of:

deaerating a body of refined soybean oil to an oxygen content of no more than 0.1 cc oxygen per 100 cc of oil;

dissolving carbon dioxide in the deaerated oil;

dispersing a minor amount of a treating agent consisting essentially of a finely divided, activated, solid, inorganic metallic salt or oxide adsorbent capable of removing color bodies from vegetable oils in the oil;

heating the dispersion in a carbon dioxide atmosphere to a temperature above 212°F for a predetermined length of time from 15 minutes to 10 hours;

filtering the oil; and deodorizing the oil with steam under vacuum.

2. A method according to claim 1 in which the treating agent further consists of a minor amount of activated carbon.

3. A method according to claim 1 in which the heating is conducted at a temperature of from 212°F to 260°F for at least 20 minutes.

4. A method according to claim 3 in which the oil is saturated with carbon dioxide and the heating is conducted at a temperature of from 240°F to 245°F for 20 to 30 minutes.

5. A method according to claim 3 in which deaeration is conducted under a vacuum of at least one half atmosphere and at a temperature between 70°F and 150°F until the oxygen content is no more than 0.1 cc oxygen per 100 cc of oil.

6. A method according to claim 5 in which deaeration is conducted under a vacuum of no more than 8 mm mercury, at a temperature from 100°F to 130°F and further including the step of bubbling nitrogen into the oil during deaeration.

7. A method according to claim 3 in which carbon dioxide is bubbled into the lower portion of the dispersion and vented from the top of the dispersion during the heating step.

8. A method according to claim 3 in which the deodorization is conducted by vacuum-steam deodorization of the body of oil at a temperature of from 425°F to 525°F and at a pressure of no more than 8 mm mercury.

9. A method according to claim 8 further including the step of saturating the treated oil with nitrogen before deodorization.

10. A method according to claim 9 in which steam deodorization is conducted at a temperature of 500°-515°F and at a pressure of 4 to 6 mm of mercury.

11. A method according to claim 1 in which all steps of the process are conducted under oxygen excluding conditions.

12. A method according to claim 1 in which the treating agent is a finely divided, activated, aluminum silicate clay present in an amount of 1 to 3 percent by weight.

13. A method according to claim 12 in which the clay is a bleaching earth.

14. A method according to claim 13 in which the clay is an acid activated bleaching earth.

15. A method according to claim 13 in which the treating agent further includes 0.1 to 0.4 percent by weight of a finely divided, activated carbon.

16. A method according to claim 15 in which the carbon is a decolorizing carbon.

17. An edible, unhydrogenated, soybean oil which does not develop objectionable odor or flavors for at least 10 minutes when heated to a frying temperature of from 325°F to 400°F produced according to the method of claim 1.

* * * * *